US011393051B2

(12) United States Patent
Williams et al.

(10) Patent No.: US 11,393,051 B2
(45) Date of Patent: Jul. 19, 2022

(54) FUEL DISPENSER UTILIZING TOKENIZED USER GUIDANCE AND PROMPTING FOR SECURE PAYMENT

(71) Applicant: Gilbarco Inc., Greensboro, NC (US)

(72) Inventors: Rodger K. Williams, Siler City, NC (US); Edward A. Payne, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 351 days.

(21) Appl. No.: 15/620,187

(22) Filed: Jun. 12, 2017

(65) Prior Publication Data

US 2017/0358040 A1 Dec. 14, 2017

Related U.S. Application Data

(60) Provisional application No. 62/348,561, filed on Jun. 10, 2016.

(51) Int. Cl.
| | |
|---|---|
| *G06Q 50/06* | (2012.01) |
| *B67D 7/14* | (2010.01) |
| *G06Q 20/38* | (2012.01) |
| *B67D 7/04* | (2010.01) |
| *B67D 7/22* | (2010.01) |

(Continued)

(52) U.S. Cl.
CPC ............... *G06Q 50/06* (2013.01); *B67D 7/04* (2013.01); *B67D 7/14* (2013.01); *B67D 7/145* (2013.01); *B67D 7/228* (2013.01); *B67D 7/243* (2013.01); *G06Q 20/18* (2013.01); *G06Q 20/202* (2013.01); *G06Q 20/385* (2013.01); *G06Q 20/3821* (2013.01); *G06Q 20/3829* (2013.01); *G06Q 20/4012* (2013.01)

(58) Field of Classification Search
CPC ........... G06Q 50/06; G06Q 20/00–425; B67D 7/00–86
See application file for complete search history.

(56) References Cited

U.S. PATENT DOCUMENTS

| 4,967,366 A | 10/1990 | Kaehler |
|---|---|---|
| 5,040,577 A | 8/1991 | Pope |

(Continued)

FOREIGN PATENT DOCUMENTS

EP 1408459 A1 4/2004

OTHER PUBLICATIONS

Newton Godoy, Asynchronous programming in C#, New Horizons Learning Centres Australia (Year: 2014).*

(Continued)

*Primary Examiner* — John W Hayes
*Assistant Examiner* — Taylor S Rak
(74) *Attorney, Agent, or Firm* — Nelson Mullins Riley & Scarborough LLP

(57) ABSTRACT

A fuel dispenser comprises fuel flow piping defining a flow path from a source of fuel toward a fueling nozzle. A plurality of fuel handling components are disposed along the fuel flow piping. Control electronics are in operative communication with the fluid handling components. A payment system includes a PIN pad that transmits secure tokens which are preferably cryptographically unique and independent such as not to be a function or derivative of network keys or user PIN. The tokens are then received and acted upon by a second subsystem to render PIN entry display data.

9 Claims, 9 Drawing Sheets

(51) Int. Cl.
  *B67D 7/24* (2010.01)
  *G06Q 20/18* (2012.01)
  *G06Q 20/20* (2012.01)
  *G06Q 20/40* (2012.01)

(56) References Cited

U.S. PATENT DOCUMENTS

| | | |
|---|---|---|
| 5,689,071 A | 11/1997 | Ruffner et al. |
| 5,734,851 A | 3/1998 | Leatherman et al. |
| 5,954,080 A | 9/1999 | Leatherman |
| 5,956,259 A | 9/1999 | Hartsell et al. |
| 6,052,629 A | 4/2000 | Leatherman et al. |
| 6,435,204 B2 | 8/2002 | White et al. |
| 6,935,191 B2 | 8/2005 | Olivier et al. |
| 7,289,877 B2 | 10/2007 | Wilson |
| 8,438,064 B2 | 5/2013 | Berrio et al. |
| 9,268,930 B2 | 2/2016 | Williams et al. |
| 9,715,600 B2 | 7/2017 | Williams et al. |
| 2009/0048710 A1 | 2/2009 | DeLine |
| 2009/0265638 A1 | 10/2009 | Carapelli et al. |
| 2011/0185319 A1 | 7/2011 | Carapelli |
| 2012/0059694 A1 | 3/2012 | Kuebert et al. |
| 2013/0103190 A1* | 4/2013 | Carapelli ............ G06F 21/82 700/237 |
| 2013/0243171 A1 | 9/2013 | Somes et al. |
| 2014/0089174 A1* | 3/2014 | Carapelli ............ G07F 19/211 705/39 |
| 2014/0279561 A1* | 9/2014 | Carapelli ............ G06Q 20/4012 705/72 |
| 2014/0337234 A1 | 11/2014 | Tang et al. |
| 2015/0120476 A1 | 4/2015 | Harrell |
| 2015/0143123 A1 | 5/2015 | Bergqvist |
| 2017/0275148 A1 | 9/2017 | Williams et al. |
| 2017/0278338 A1 | 9/2017 | Payne et al. |

OTHER PUBLICATIONS

Jeff Tyson & Tracy V. Wilson, How Graphics Cards Work, howstuffworks.com (Year: 2014).*
International Search Report and Written Opinion dated Aug. 21, 2017 in corresponding PCT application serial No. PCT/US2017/037006, all enclosed pages cited.

* cited by examiner

FUEL DISPENSER UTILIZING TOKENIZED USER GUIDANCE AND PROMPTING FOR SECURE PAYMENT

PRIORITY CLAIM

This application is based upon and claim priority to provisional application Ser. No. 62/548,561, filed Jun. 10, 2016, which is incorporated herein by reference in its entirety for all purposes.

FIELD OF THE INVENTION

The present invention relates generally to service stations at which fuel is dispensed. More particularly, the present invention relates to a fuel dispenser having a novel display architecture utilizing tokenized user guidance and prompting for secure payment.

BACKGROUND

Retail fueling environments usually include a plurality of fuel dispensers located in a forecourt area outside of a convenience store building. Typically, the fuel dispensers will each be equipped with pay-at-the-pump capability by which the customer can perform the fueling transaction using a user interface on the respective fuel dispenser. For example, the customer can present a credit or debit card using a card reader installed on the fuel dispenser's user interface to pay for the fuel without entering the store. Internally, the dispensers typically contain flow meters, pulsers, control electronics, valves, manifolds, and internal piping. Many of these components are subject to regulatory requirements to maintain a high degree of accuracy.

Accepting payment cards as a method of payment subjects various fuel dispenser components to security standards and regulations promulgated by the Payment Card Industry ("PCI") and/or EMV (Europay, MasterCard and Visa). These standards were created in an attempt to prevent fraud and other security issues that arise due to the acceptance of payment cards and the transmission of sensitive information associated with the payment cards, such as account number, account holder information, and personal identification numbers ("PIN"). Generally speaking, these standards and requirements must be met by both software and hardware components used to receive, store, transmit, or otherwise handle the sensitive information.

Hardware and software used to produce messages for instructional information, prompts, and key-press acknowledgements (collectively "payment display data") are subject to EMV/PCI specifications. In a typical configuration, the PIN pad utilized in a fuel dispenser will be a secure device having various electronic components contained in a tamper-proof housing. A secure display controller (i.e., graphical rendering hardware) is contained in the PIN pad's housing to generate payment display data during a secure "payment mode" (i.e., a period of time during which sensitive payment information, such as a PIN, is entered and received). The PIN pad is connected to the actual display (typically a flat LCD display device) via a secure non-exposed channel.

In addition, a separate media source, external to the payment system's security zone, may interact with the fuel dispenser's display(s) to provide media (e.g., video, graphical information, and/or textual messages) for purposes unrelated to payment, such as advertising. For security purposes, this media source communicates with and is "gated" by the display controller inside the PIN pad. During the payment mode, the PIN pad's display controller prevents access to the display by the external media source. When the payment system is not in a payment mode, the PIN pad's display controller may allow the external media source to send media to the display(s).

SUMMARY OF CERTAIN ASPECTS

The present invention recognizes and addresses the foregoing considerations, and others, of prior art construction and methods. In this regard, certain exemplary and nonlimiting aspects of the present invention will now be described. These aspects are intended to provide some context for certain principles associated with the present invention, but are not intended to be defining of the full scope of the present invention.

Certain aspects of the present invention are directed to a fuel dispenser comprising fuel flow piping defining a flow path from a source of fuel toward a fueling nozzle. A plurality of fuel handling components are disposed along the fuel flow piping. Control electronics are in operative communication with the fluid handling components. The fuel dispenser further includes a payment system including a PIN pad device, a display processor having an associated memory, and a display, the PIN pad device being in communication with the display processor and the display processor being in communication with the display. The PIN pad device securely stores a plurality of electronic tokens corresponding to payment display data, the payment display data being securely stored and accessible by the display processor. The PIN pad device operative to transmit the electronic tokens to the display processor, the display processor utilizing the electronic tokens to identify specific payment display data and cause the specific payment display data to be rendered on the display. The payment display data may comprise, for example, transaction related prompts and messages displayed to a user on the display.

According to some example embodiments, the payment system includes a card reader in communication with the PIN pad device. The PIN pad device may preferably execute a secure payment application. Furthermore, the PIN pad device may communicate with one of an enhanced dispenser hub and a point of sale (POS) system external to the fuel dispenser.

According to some example embodiments, the electronic tokens may be cryptographically unique and independent of network keys and a user's personal identification number (PIN). The specific display data may preferably be stored in encrypted form but accessible by the display processor via the electronic tokens. The display processor may enter a payment mode during which the electronic tokens are received and otherwise allows display of nonpayment information on the display. The display of nonpayment information may be blocked during the payment mode.

According to some example embodiments, the display processor may be implemented on one core of a multi-core processor having at least two processor cores on a single semiconductor die. For example, the one core may operate separately and asynchronously from at least one other core on the multi-core processor. The multi-core processor may have at least four processor cores.

According to another aspect, the present invention provides a fuel dispenser payment system comprising a PIN pad device executing a secure payment application and securely storing a plurality of electronic tokens corresponding to payment display data. A card reader is in communication with the PIN pad device. A display processor having an associated memory is also provided. The display processor is in communication with the PIN pad device, the payment display data being securely stored so as to be accessible by the display processor. In addition, a display is in communication with the display processor. The PIN pad device is operative to transmit the electronic tokens to the display processor, the display processor utilizing the electronic tokens to identify specific payment display data and cause the specific payment display data to be rendered by the display.

Different systems and methods of the present invention utilize various combinations of the disclosed elements and method steps as supported by the overall disclosure herein. Thus, combinations of elements other than those discussed above may be claimed. Moreover, the accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
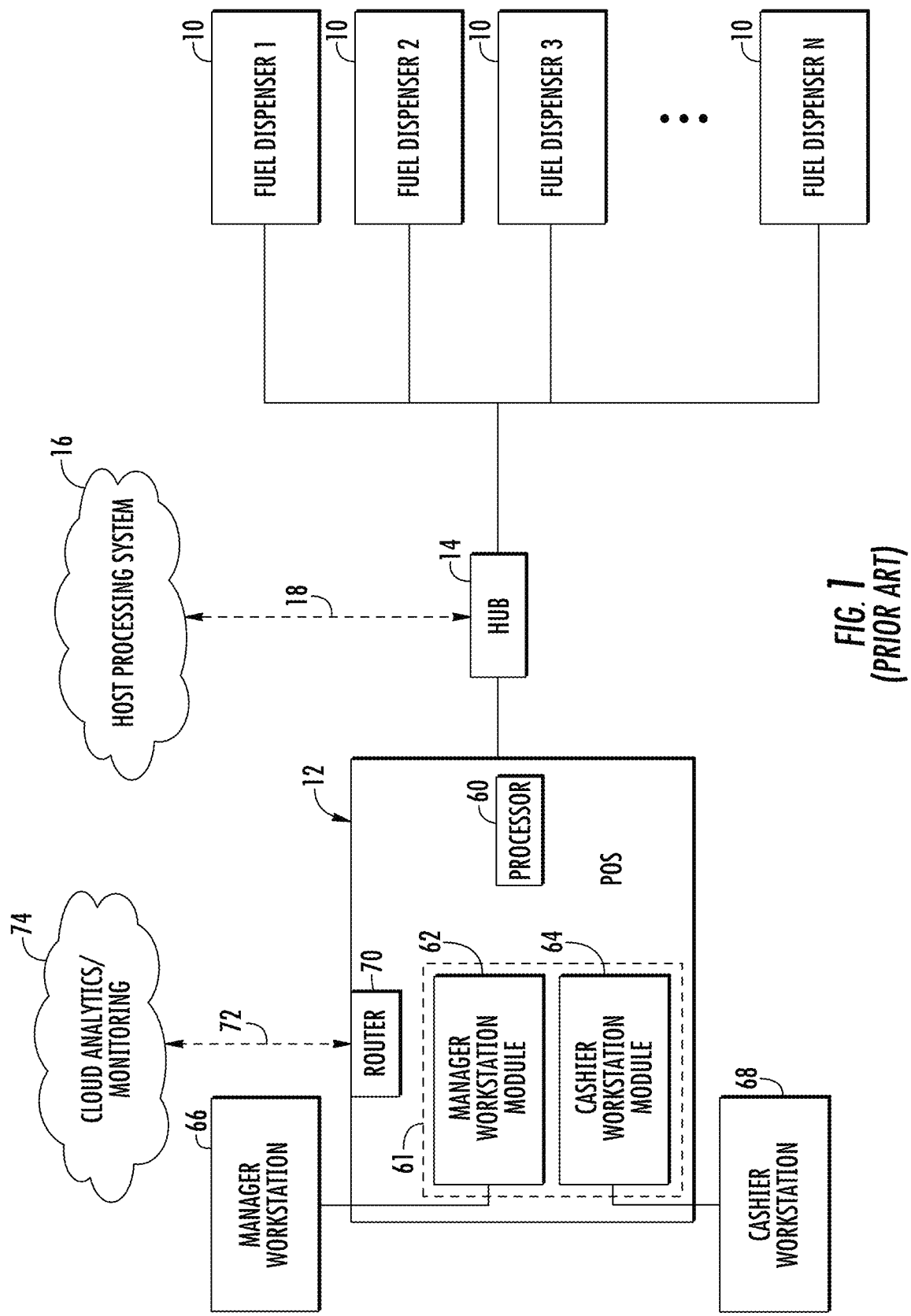
FIG. 1 is a diagrammatic representation of a retail fueling environment of the prior art.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Some embodiments of the present invention may be particularly suitable for use with a fuel dispenser in a retail service station environment, and the below discussion will describe some preferred embodiments in that context. However, those of skill in the art will understand that the present invention is not so limited. In fact, it is contemplated that embodiments of the present invention may be used with any fluid dispensing environment and with other fluid dispensers. For example, embodiments of the present invention may also be used with diesel exhaust fluid (DEF) dispensers, compressed natural gas (CNG) dispensers, and liquefied petroleum gas (LPG) and liquid natural gas (LNG) applications, among others. In addition, aspects of the present invention may be applicable to other retail environments in which payment cards (or equivalent payment account indicia) are used to purchase various goods or services.

Examples of retail fueling environments, fuel dispensers, and user interfaces for fuel dispensers are provided in U.S. Pat. No. 6,435,204 (entitled "Fuel Dispensing System"), U.S. Pat. No. 5,956,259 (entitled "Intelligent Fueling"), U.S. Pat. No. 5,734,851 (entitled "Multimedia Video/Graphics in Fuel Dispensers"), U.S. Pat. No. 6,052,629 (entitled "Internet Capable Browser Dispenser Architecture"), U.S. Pat. No. 5,689,071 (entitled "Wide Range, High Accuracy Flow Meter"), U.S. Pat. No. 6,935,191 (entitled "Fuel Dispenser Fuel Flow Meter Device, System and Method"), U.S. Pat. No. 7,289,877 (entitled "Fuel Dispensing System for Cash Customers"), U.S. Pat. No. 8,438,064 (entitled "Payment Processing System for Use in a Retail Environment having Segmented Architecture"), and U.S. published patent application nos. 20090048710 (entitled "Fuel Dispenser"), 20090265638 (entitled "System and Method for Controlling Secure Content and Non-secure Content at a Fuel Dispenser or other Retail Device"), 20110185319 (entitled "Virtual PIN Pad for Fuel Payment Systems"), 20130059694 (entitled "Fuel Dispenser Application Framework"), and 20130103190 (entitled "Fuel Dispenser User Interface System Architecture"). The entire disclosure of each of the foregoing patents and applications is hereby incorporated by reference as if set forth verbatim herein for all purposes.

FIG. 1 illustrates an exemplary retail fueling environment of the prior art which may be modified in accordance with aspects of the present invention. One or more fuel dispensers 10 are located in the forecourt region of the retail fueling environment. The fuel dispensers are operative to dispense fuel supplied from one or more underground storage tanks (USTs) into a customer's vehicle. The fuel dispensers are provided with "pay-at-the-pump" capability, allowing the customer to authorize and pay for the fueling transaction at the dispenser itself. The retail fueling environment also includes a point-of-sale (POS) system 12 that handles in-store sales activities, as well as various inventory and configuration functions.

The retail fueling environment of FIG. 1 utilizes an enhanced dispenser hub (EDH) 14 as shown and described in U.S. Pat. No. 8,438,064. EDH 14 includes an electronic payment server that allows processing of payment card information. In particular, credit (or debit) card information from the fuel dispensers 10 and any in-store card readers is fed to EDH 14, which seeks approval from a remote host processing system 16 via a suitable off-site communication link 18.

Figure 2:
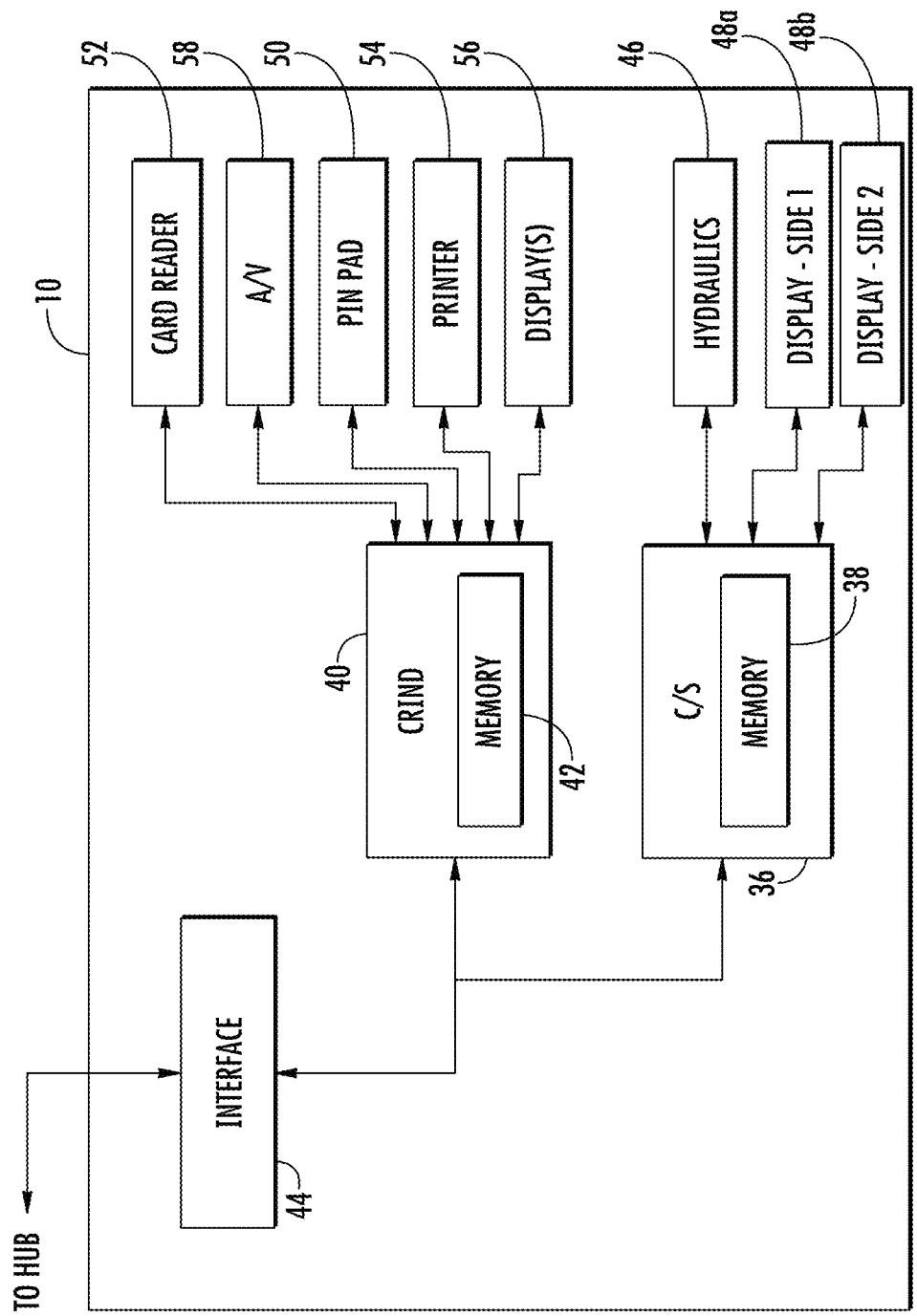
FIG. 2 is a diagrammatic representation showing additional details of a fuel dispenser shown in FIG. 1.

Referring now to FIG. 2, additional details regarding the various components of fuel dispenser 10 can be more easily explained. As shown, fuel dispenser 10 includes a control system 36 having an associated memory 38. In addition, dispenser 10 may also comprise a CRIND (card reader in dispenser) module 40 and associated memory 42. Those of ordinary skill in the art are familiar with CRIND units used in fuel dispensers, but additional background information is provided in U.S. Pat. No. 4,967,366, the entirety of which is incorporated by reference herein for all purposes. As shown, control system 36 and CRIND module 40 are in operative communication with EDH 14 via an interface 44.

Control system 36 includes the hardware and software necessary to control the hydraulic components and functions of dispenser 10. Those of ordinary skill in the art are familiar with the operation of the hydraulics 46 of dispenser 10. In general, however, fuel from USTs is pumped through a piping network into an inlet pipe. Fuel being dispensed passes though a flow meter, which is responsive to flow rate or volume. A pulser is employed to generate a signal in response to fuel flow though the meter and communicate this information to control system 36. Control system 36 may also provide control signaling to a valve that may be opened and closed to permit or not permit dispensing of fuel.

Meter flow measurements from the pulser are collected by control system 36. Control system 36 also typically performs calculations such as cost associated with a fuel dispensing transaction. As a dispensing transaction progresses, fuel is then delivered to a hose and through a nozzle into the customer's vehicle. Dispenser 10 includes a nozzle boot, which may be used to hold and retain the nozzle when not in use. The nozzle boot may include a mechanical or electronic switch in communication with control system 36 to indicate when the nozzle has been removed for a fuel dispensing request and when the nozzle has been replaced, signifying the end of a fueling transaction. Control system 36 may thus determine whether a transaction has been initiated or completed.

Control system 36 may further be operative to control one or more displays, such as displays 48a and 48b provided on respective sides of fuel dispenser 10. For example, a transaction price total display may present customers with the price for fuel that is dispensed. A transaction gallon total display may be used to present customers with the measurement of fuel dispensed in units of gallons or liters. Finally, price per unit (PPU) displays may be provided to show the price per unit of fuel dispensed in either gallons or liters, depending on the programming of dispenser 10.

CRIND module 40 includes the hardware and software necessary to support payment processing and peripheral interfaces at dispenser 10. In this regard, CRIND module 40 may be in operative communication with several input devices. For example, a PIN pad 50 is typically used for entry of a PIN if the customer is using a debit card for payment of fuel or other goods or services. CRIND module 40 may also be in operative communication with a card reader 52 for accepting credit, debit, or other magnetic stripe cards for payment. Additionally, card reader 52 may accept loyalty or program-specific cards as is well known. Further, CRIND module 40 may be in operative communication with other payment or transactional devices such as a receipt printer 54.

One or more display(s) 56 may be used to display information, such as transaction-related prompts and advertising, to the customer. Again, two such displays would typically be provided on a two-sided dispenser. The customer may use soft keys to respond to information requests presented to the user via a display 56. In some embodiments, however, a touch screen may be used for a display 56.

Audio/video electronics 58 are adapted to interface with the CRIND module 40 and/or an auxiliary audio/video source to provide advertising, merchandising, and multimedia presentations to a customer in addition to basic transaction functions. The graphical user interface provided by the dispenser may allow customers to purchase goods and services other than fuel at the dispenser. For example, the customer may purchase a car wash and/or order food from the store while fueling a vehicle.

Referring again to FIG. 1, POS 12 includes a server having a processor 60 and associated memory 61. In the present example, processor 60 executes several software modules including manager workstation module 62 and cashier workstation module 64. When executed, manager workstation module 62 displays a GUI on manager workstation 66 that allows the owner, operator, or manager of the fueling station to set options for the fueling environment. Manager workstation module 66 is also adapted to provide point-of-sale ("POS") capabilities, including the ability to conduct transactions for items offered for sale by the fueling station. Toward this end, manager workstation 66 includes a suitable display, such as a touchscreen display. As one skilled in art will appreciate, the server may be incorporated into the hardware of manager workstation 66.

Similarly, cashier workstation module 64 provides the station's cashier, clerk, or employee the means necessary to effect a transaction for one or more items or services offered by the fueling station. Cashier workstation module 64 communicates with the hardware of cashier workstation 68, which includes its own display.

A suitable router 70 may be associated with POS 12 for internet communication. Fuel dispensers 10 and POS 12 may thus have access to various resources (via internet link 72) that may be provided remotely from the cloud 74.

In operation, a user positions a vehicle adjacent to one of dispensers 10 and uses the dispenser to refuel the vehicle. For payment, the user inserts and removes a payment card from card reader 52. Card reader 52 reads the information on the payment card and transmits the information to a forecourt module via a card reader module, both modules being part of EDH 14. The forecourt module provides the payment information to a payment network payment module also part of EDH 14, which contacts host processing system 16 operated by the financial institution associated with the user's payment card. The financial institution either validates or denies the transaction and transmits such a response to the network payment module. The information received from the financial institution's host computer system is transmitted from the network payment module back to the forecourt module to handle appropriately. This may include transmitting to dispenser 10 a request that the user provide another payment card if the transaction is denied or printing a receipt if authorized.

Figure 3:
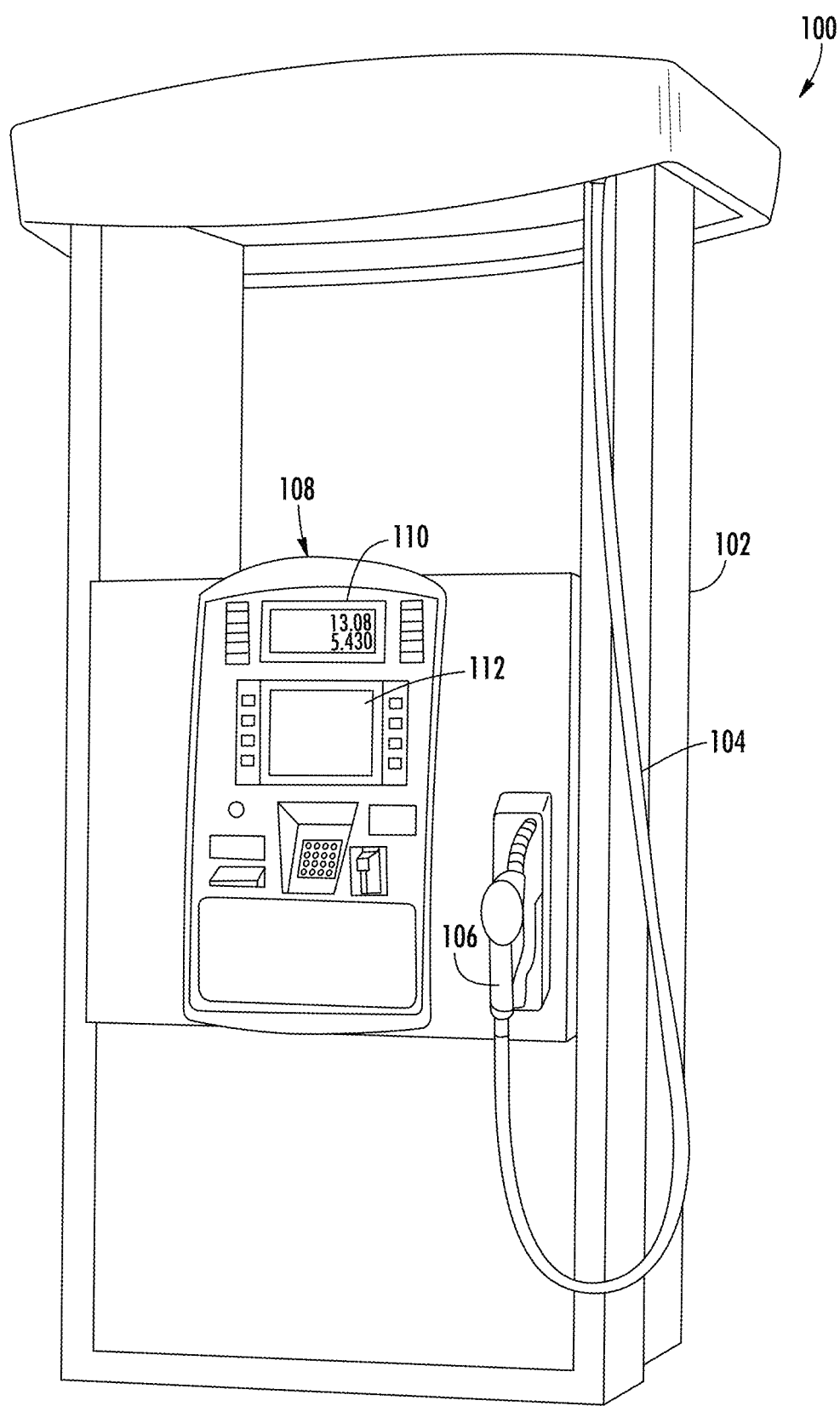
FIG. 3 is a perspective view of an exemplary fuel dispenser in accordance with an embodiment of the present invention.
Figure 4:
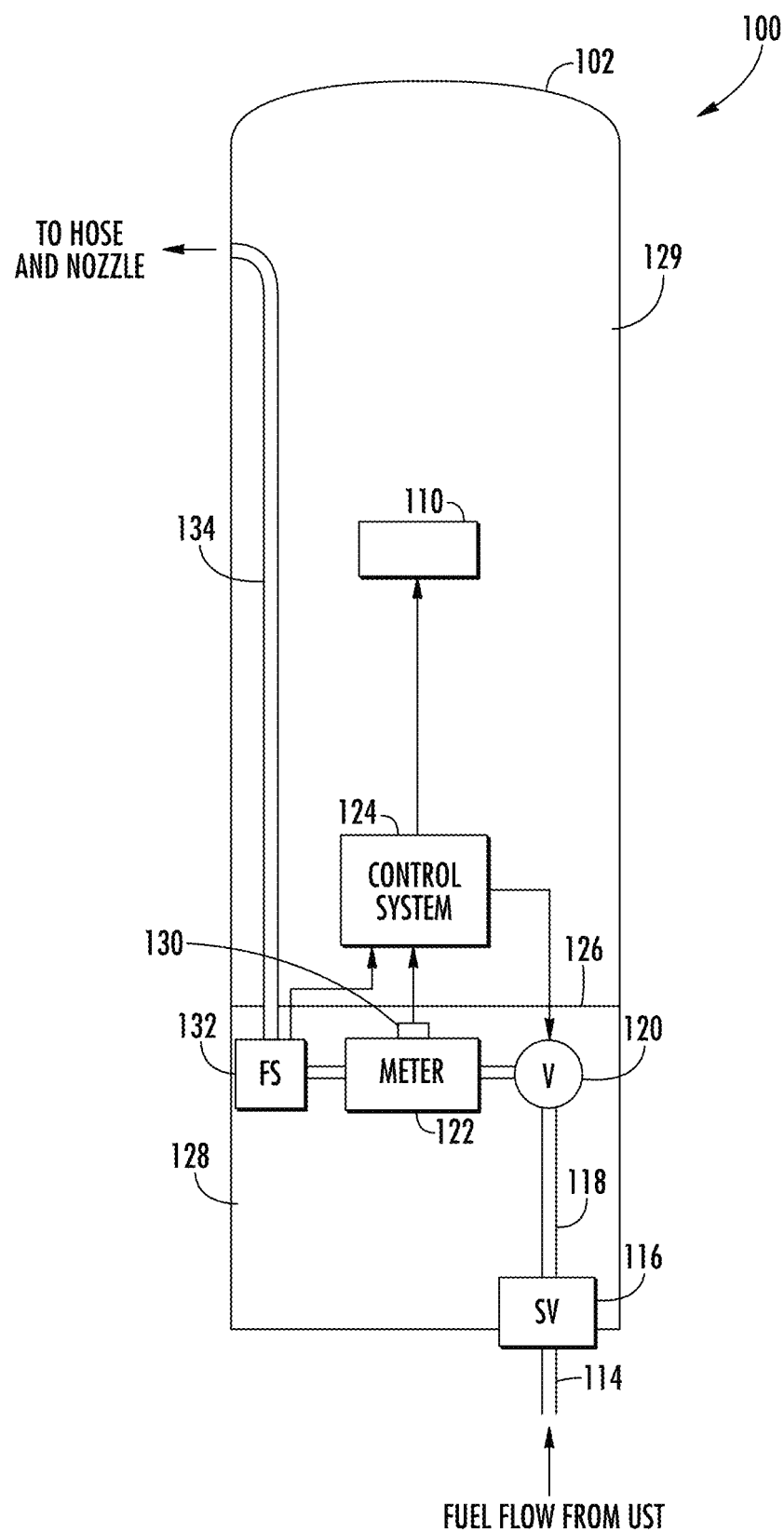
FIG. 4 is a diagrammatic representation of internal components of the fuel dispenser of FIG. 3 according to an embodiment of the present invention.

Referring now to FIGS. 3 and 4, a fuel dispenser 100 in accordance with an aspect of the present invention will be described. One skilled in the art will recognize that many of aspects of fuel dispenser 100 are conventional, and similar to aspects described above in relation to the prior art. However, as will be explained more fully below, fuel dispenser 100 utilizes a novel arrangement not requiring generation and presentation of secure payment media to be accomplished by hardware within the PIN pad. Various advantages, some of which are explained below, can be realized as a result.

As shown in FIG. 3, fuel dispenser 100 includes a housing 102 with a flexible fuel hose 104 extending therefrom. Fuel hose 104 terminates in a manually-operated nozzle 106 adapted to be inserted into a fill neck of a vehicle's fuel tank. Nozzle 106 includes a fuel valve. Various fuel handling components, such as valves and meters, are also located inside of housing 102. These fuel handling components allow fuel to be received from underground piping and delivered through hose 104 and nozzle 106 to a vehicle's tank, as is well understood.

Fuel dispenser 100 has a customer interface 108. Customer interface 108 may include an information display 110 relating to an ongoing fueling transaction that includes the amount of fuel dispensed and the price of the dispensed fuel. Further, customer interface 108 may include a display 112 that provides instructions to the customer regarding the fueling transaction. Display 112 may also provide advertising, merchandising, and multimedia presentations to a customer, and may allow the customer to purchase goods and services other than fuel at the dispenser.

FIG. 4 is a schematic illustration of internal fuel flow components of fuel dispenser 100 according to an embodiment of the present invention. In general, fuel may travel from an underground storage tank (UST) via main fuel piping 114, which may be a double-walled pipe having secondary containment as is well known, to fuel dispenser 100 and nozzle 106 for delivery. More specifically, a submersible turbine pump (STP) associated with the UST is used to pump fuel to the fuel dispenser 100. However, some fuel dispensers may be self-contained, meaning fuel is drawn to the fuel dispenser 100 by a pump unit positioned within housing 102.

Main fuel piping 114 passes into housing 102 through a shear valve 116. As is well known, shear valve 116 is designed to close the fuel flow path in the event of an impact to fuel dispenser 100. Shear valve 116 contains an internal fuel flow path to carry fuel from main fuel piping 114 to internal fuel piping 118.

After fuel exits the outlet of shear valve 116 and enters into internal fuel piping 118, it flows toward a flow control valve 120 positioned upstream of a flow meter 122. Alternatively, valve 120 may be positioned downstream of the flow meter 122. In one embodiment, valve 120 may be a proportional solenoid controlled valve, such as described in U.S. Pat. No. 5,954,080, hereby incorporated by reference in its entirety for all purposes.

Flow control valve 122 is under control of a control system 124. Control system 124 typically controls aspects of fuel dispenser 100, such as valves, displays, and the like. For example, control system 124 instructs flow control valve 120 to open when a fueling transaction is authorized. In addition, control system 124 may be in electronic communication with EDH 14 (or with the POS in embodiments where the forecourt control functionality is part of the POS). The EDH communicates with control system 124 to control authorization of fueling transactions and other conventional activities.

A vapor barrier 126 delimits hydraulics compartment 128 of fuel dispenser 100, and control system 124 is located in electronics compartment 129 above vapor barrier 126. Fluid handling components, such as flow meter 122, are located in hydraulics compartment 128. In this regard, flow meter 122 may be any suitable flow meter known to those of skill in the art, including positive displacement, inferential, and Coriolis mass flow meters, among others. Meter 122 typically comprises electronics 130 that communicates information representative of the flow rate or volume to control system 124. For example, electronics 130 may include a pulser or other suitable displacement sensor as known to those skilled in the art. In this manner, control system 124 can update the total gallons (or liters) dispensed and the price of the fuel dispensed on information display 110.

As fuel leaves flow meter 122 it enters a flow switch 132, which preferably comprises a one-way check valve that prevents rearward flow through fuel dispenser 100. Flow switch 132 provides a flow switch communication signal to control system 124 when fuel is flowing through flow meter 122. The flow switch communication signal indicates to control system 124 that fuel is actually flowing in the fuel delivery path and that subsequent signals from flow meter 122 are due to actual fuel flow. Fuel from flow switch 132 exits through internal fuel piping 134 to fuel hose 104 and nozzle 106 for delivery to the customer's vehicle.

A blend manifold may also be provided downstream of flow switch 132. The blend manifold receives fuels of varying octane levels from the various USTs and ensures that fuel of the octane level selected by the customer is delivered. In addition, fuel dispenser 100 may in some embodiments comprise a vapor recovery system to recover fuel vapors through nozzle 106 and hose 104 to return to the UST. An example of a vapor recovery assist equipped fuel dispenser is disclosed in U.S. Pat. No. 5,040,577, incorporated by reference herein in its entirety for all purposes.

Figure 5:
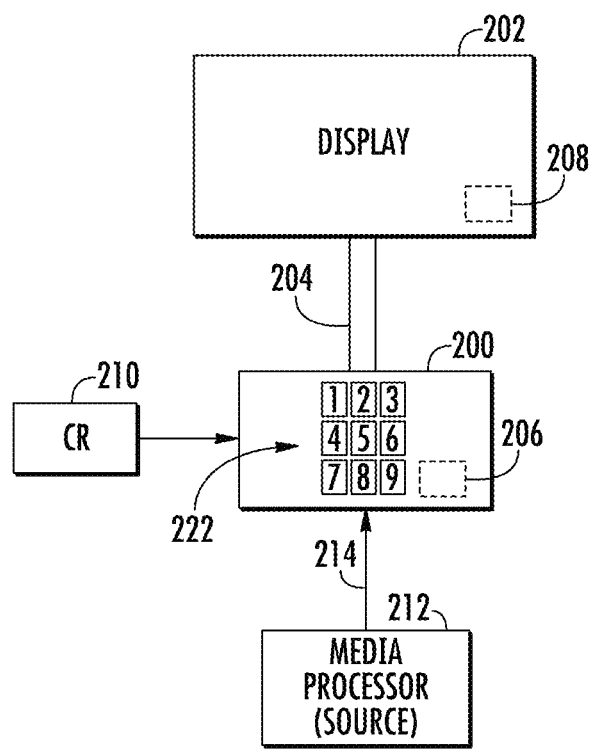
FIG. 5 is a diagrammatic representation of a prior art arrangement for providing media from an external media processor via a display controller in the PIN pad.
Figure 6:
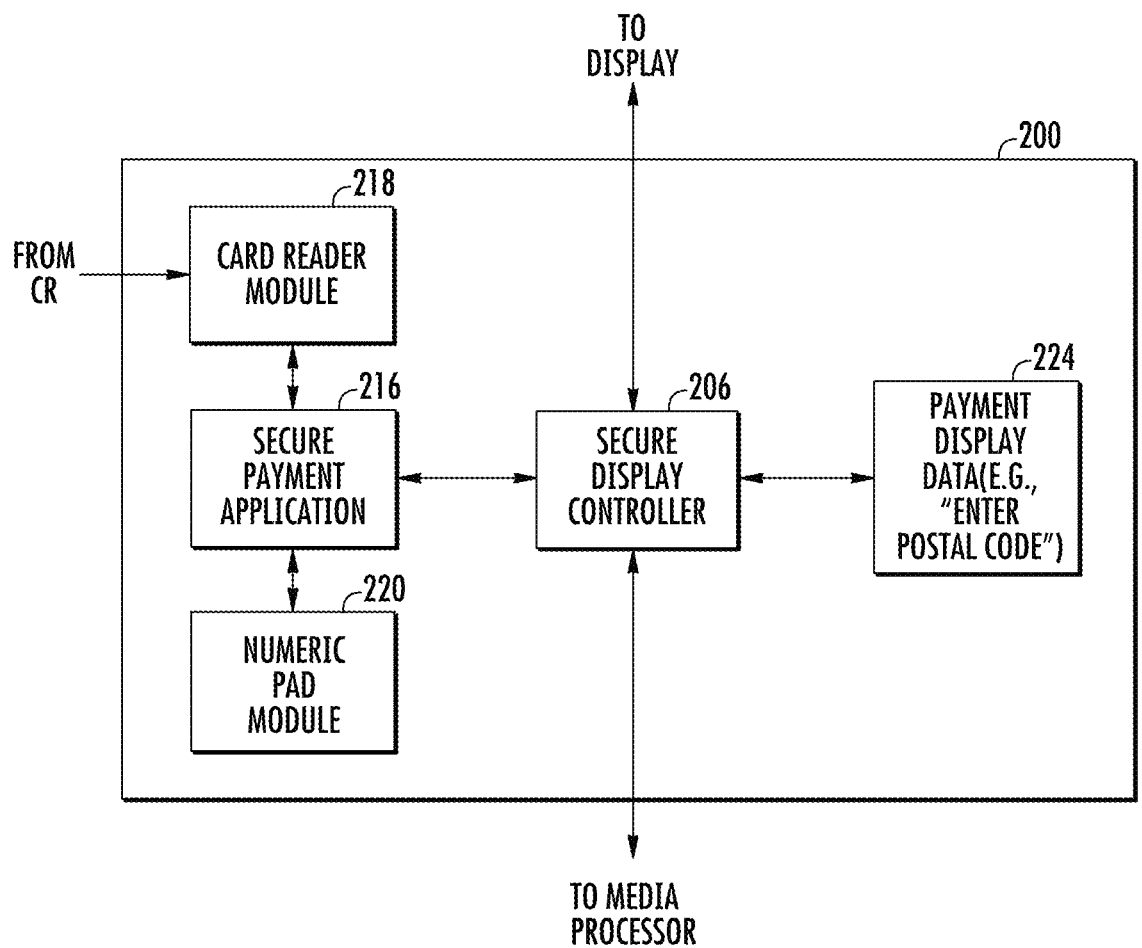
FIG. 6 shows additional detail regarding internal components of the PIN pad of FIG. 5.

Referring now to FIGS. 5 and 6, a typical media control arrangement of the prior art will be discussed to better place certain aspects of the present invention in context. In this regard, FIG. 5 shows a secure PIN pad 200 of the prior art tethered to a display 202 (similar to displays 56 and 112) via a secure cable 204. In particular, secure cable 204 is generally configured such that attempts to compromise the physical connection between PIN pad 200 and display 202 will be unsuccessful. Inside of its tamperproof housing, PIN pad 200 includes a secure media controller 206 that communicates with a display controller 208 of display 202. As shown, card reader ("CR") 210 of the fuel dispenser's user interface is also fed directly into the PIN pad 200.

As noted above, it is desirable to allow various advertising messages and other media to be presented on display 202 when the fuel dispenser or other retail device is not in a payment mode. In this regard, an external media processor 212 is operatively connected to PIN pad 200 as a source of such media. In particular, media processor 212 may itself generate non-secure media to be displayed or it may receive and coordinate media supplied from another source (including via the Internet). Regardless, the non-secure media is "gated" by secure media controller 206 of PIN pad 200. Typically, the communication path 214 between media processor 212 and PIN pad 206 will be non-secure and "exposed."

Certain additional details of the prior art can be most easily explained with reference to FIG. 6. A secure payment application 216 resides on PIN pad 200 to coordinate entry of sensitive payment information. In this regard, the secure payment application 216 works in conjunction with a card reader module 218 (which may be implemented as software or hardware) to receive card information from the card reader 210. Similarly, a numeric pad module 220 informs secure payment application 216 which keys of the PIN pad (keys shown collectively at 222 in FIG. 5) are pressed and in which order.

Secure payment application 216 communicates with the secure display controller 206 in order to provide the payment display data on display 202. The display data may include instructions, prompts, and acknowledgements as necessary or desired during the payment mode. For example, a customer may be prompted to enter a postal code into the PIN pad 200 that corresponds to the billing address of the payment card or account being tendered. The payment display data are typically pre-coded and accessible only by the secure display controller 206 (as indicated at 224).

As noted above, secure display controller 206 "gates" media supplied by an external source when it is not in the payment mode. While this configuration provides the requisite security, the use of internal PIN pad graphical rendering hardware necessarily involves cost tradeoffs and constraints. Nominally and historically, the graphical rendering hardware capability within a PIN pad is minimized to reduce cost, its purpose limited to prompts and user key-press acknowledgments. This results in limitations on display resolution(s), display type(s), associated physical interface layers such as HDMI or LVDS, number of active "lanes," clock rates, and the like.

Figure 7:
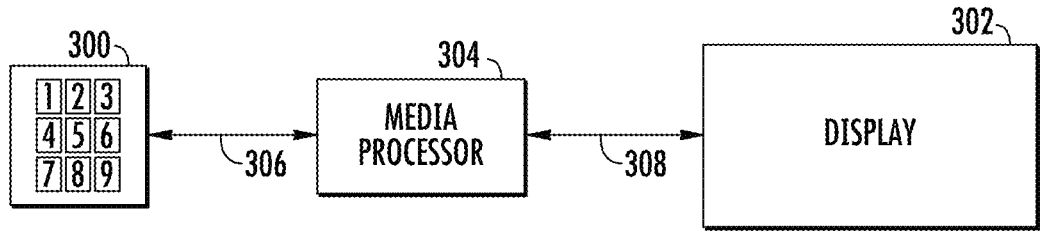
FIG. 7 is a simplified diagrammatic representation of an arrangement in accordance with the present invention which is operative to render PIN entry display data.

Referring now to FIG. 7, various limitations of the prior art are overcome by an arrangement in accordance with the present invention. Like PIN pad 200 of the prior art, PIN pad 300 is preferably a secure device in compliance with EMV, PCI or the like. Unlike PIN pad 200, however, a PIN pad 300 constructed according to the present invention is preferably a much simplified device that does not contain graphical presentation hardware. Instead, PIN pad 300 preferably transmits secure tokens which are cryptographically unique and independent such as not to be a function or derivative of network keys or user PIN. The tokens are then received and acted upon by a second subsystem to render instructional information, prompts, and/or user key-press acknowledgements, collectively constituting the payment display data (media).

By way of further explanation, display device 302 receives data for presentation from a media processor 304 which corresponds generally to media processor 212 of FIG. 5. PIN pad 300 communicates with media processor 304 via communication link 306. Media processor 304 and display device 302 communicate via link 308. While communication links 306 and 308 may be "exposed," the tokenized messages between PIN pad 300 and media processor 304 are preferably encrypted or otherwise secure. In particular, a plurality of encrypted, signed, securely stored and/or validated display graphics are hosted on the media processor 304 (unlike media processor 212 of the prior art). These graphics (i.e., payment display data) are associated with a specific display request generated by the PIN pad 300 and validated in a secure (and, for example, EMV or PCI defined) manner prior to the media processor 304 rendering the PIN pad requested content to the device display 302.

Preferably, the non-secure media processor 304 must be able to decrypt the content (encrypted and signed media) requested by PIN pad 300 via a shared encryption scheme and/or token passed over the link 306. The encryption keys used to decrypt content can be negotiated between the PIN pad 300 and media processor 304 or injected at time of production of each. In some embodiments, media processor 304 will only decrypt and display content to the display device 302 if PIN pad 300 is in payment (e.g., PIN entry) mode. When the PIN pad 300 is not in payment or other secure input mode, the media processor 304 may render any content or media to the display device 302.

In an alternate/further embodiment, physical interconnection 308 in FIG. 7 may be armored and/or tamper-detecting, whereby media processor 304 may then validate/maintain trust. This trust further enables or disables payment capability/willingness between PIN pad 300 and media processor 304. It appears PCI4 is readably obtainable by keypad-CPU and keypad-buttons, these two items themselves exclusively being ensconced within a secure (tamperproof and/or tamper-detecting) enclosure, importantly with the display being external from said enclosure. This alone is believed sufficient to gain enough PCI "points" for certification. In this case, however, the display may be utilized for multiple purposes, hence use of tokens as described herein. Additional validation of trust between display 308 and token-accepting processor 304 may also be provided.

Figure 8:
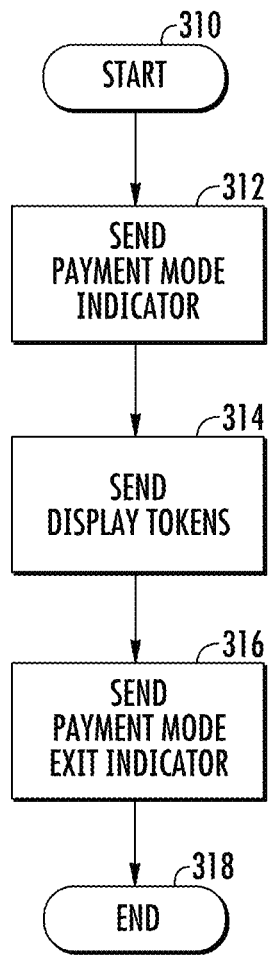
FIG. 8 is a flowchart showing aspects of the operation of the PIN pad in FIG. 7.

FIG. 8 shows some aspects of an operational process from the standpoint of PIN pad 300. The process begins at 310. At 312, PIN pad 300 sends an indication to media processor 304 that a secure payment mode is being entered. Various display tokens indicative of the desired payment display data to be shown on display 302 are securely stored at PIN pad 300. As indicated at 314, display tokens are then passed to media processor 304, which uses the display tokens to identify specific display data. For example, one token may inform media processor 304 to present the message "Enter PIN Number Now" on display 302. Another token may correspond to the message "Your PIN has been accepted," etc. After the payment process is complete, an indication is sent to media processor 304 that it may exit the secure payment mode (as indicated at 316). The process ends at 318.

Figure 9:
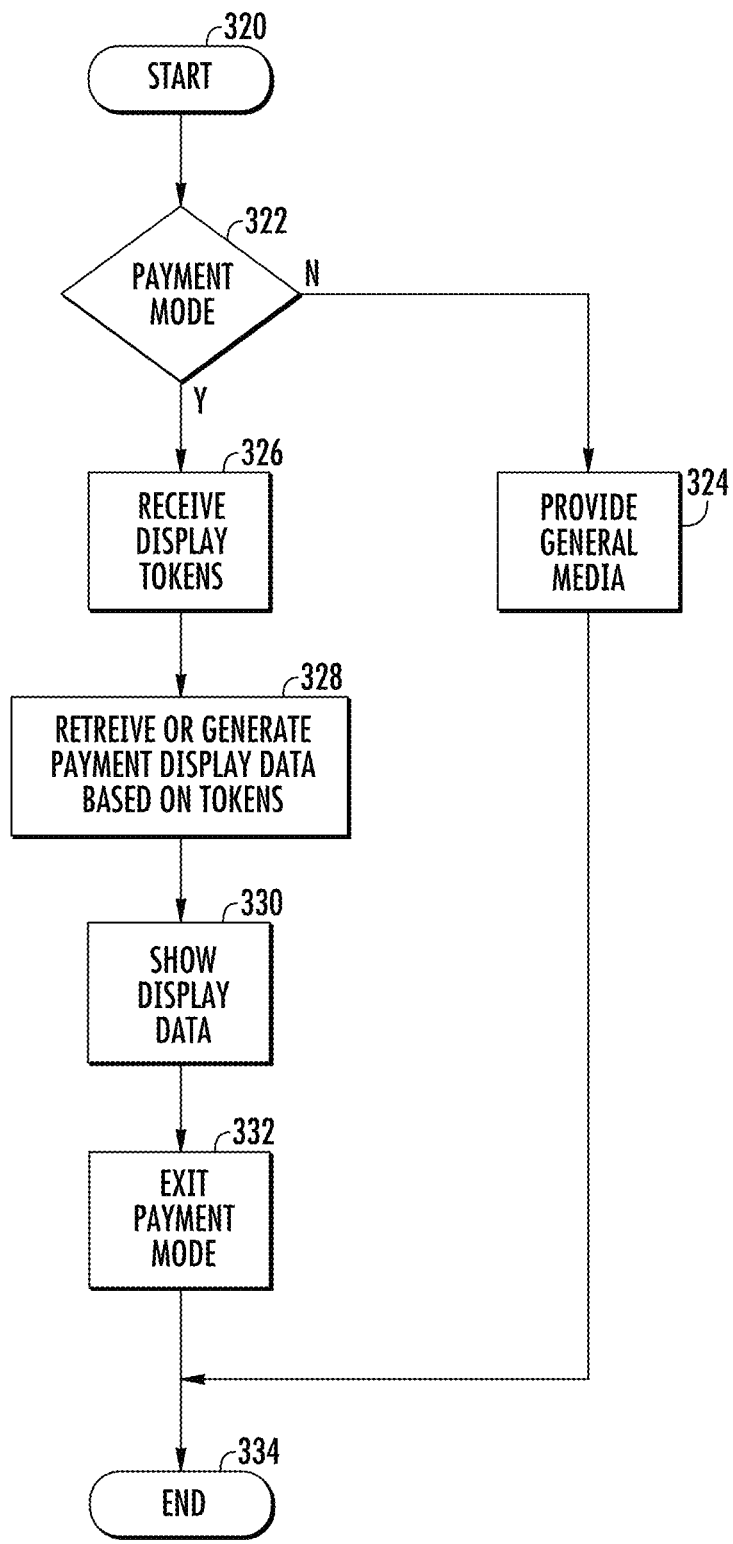
FIG. 9 is a flowchart showing aspects of the operation of the media processor in FIG. 7.

FIG. 9 shows some aspects of an operational process from the standpoint of media processor 304. The process begins at 320. At 322, a determination is made as to whether PIN pad 300 is in the payment mode. If not, any media may be shown on display 302 (as indicated at 324). If PIN pad 300 is in the payment mode, media processor 304 begins to receive tokens representative of payment display data (as indicated at 326). Based on the tokens, the display data are either retrieved (if pre-stored) or generated as needed by media processor 304 (as indicated at 328). The payment display data corresponding to the tokens are then presented on display 302 (as indicated at 330). When the payment process is complete, PIN pad 300 sends an indication to media processor 304 that it is exiting payment mode (as indicated at 332). The process ends at 334.

The skilled artisan will appreciate that this arrangement provides various advantages in comparison with the prior art. These include:

Improved and advanced graphical rendering on fuel dispensing equipment.

Cost tradeoffs and constraints upon internal PIN pad graphical rendering hardware are eliminated. By transferring graphical responsibilities via tokenization to a second system whose expected functionality nominally must include advanced graphical rendering hardware, ergonomically efficacious rendering is now made possible without incremental cost, this including but not limited to overlaying, shading, hovering, shadowing, translucency (frosted glass), and/or windowing, etc.

Reduced cost of aforementioned improved and advanced graphical rendering by removal from PIN pad and transference to a more efficacious external embodiment. Thus, reduced total cost of petroleum dispensing equipment manufacture.

Financial security and compliance with EMV, PCI, etc., and reduced cost to comply thereto.

The PIN pad, or historical/present-art graphical output interface thereof, now absent of display generation, is therefore no longer tied to a specific (or set of specific) display resolution(s), display type(s), or associated physical interface layer such as HDMI or LVDS, nor number of active "lanes" and/or clock rates that vary widely within LVDS implementations.

Because the PIN pad is now absent this gated media conveyance requirement, the media no longer must be compliant with a varying display resolutions, display types, or physical layers such as HDMI or LVDS, nor number of active "lanes" and/or clock rates that vary widely within LVDS implementations.

Preferred (marketplace availability and cost of display device) resolutions change over time, typically trending toward increase in pixel density, thereby obsolescing compatibility with those display devices and their associated interfacing requirements at time of PIN pad design. Because this risk is removed from the PIN pad, the PIN pad is no longer a limitation in updating fuel dispensing equipment.

The secure armored and/or tamper detecting link between PIN pad and display device can be eliminated.

The PIN pad, no longer nexus for two graphical interfaces in addition to network communication interfaces, at least two or more having earth or DC ground reference, now reduced to a single communications interface that may further convey DC power, no longer introduces a ground loop, and is therefore more immune from noise or conducted emissions, and similarly is reduced as possibility of noise or conducted emissions source.

According to a preferred embodiment, the PIN pad interface may be implemented as a single USB 2.0 (or greater) cable, thereby simultaneously conveying DC power for operation in conjunction with communications within a single cable, simplifying installation, simplifying removal for replacement, and reducing cost.

Figure 10:
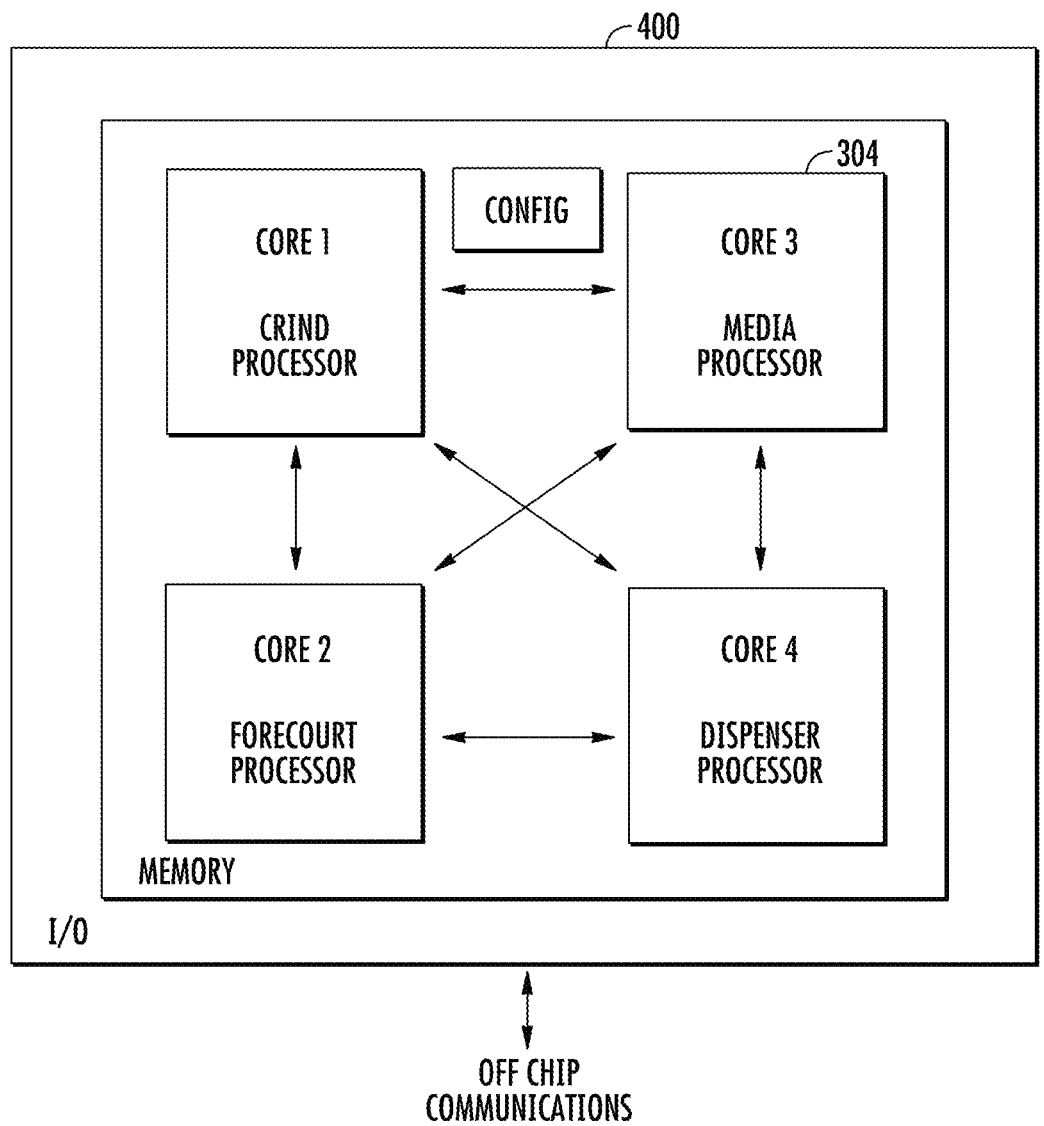
FIG. 10 is a diagrammatic representation of multi-core control electronics which may implement the media processor of FIG. 7 in a preferred embodiment.

Referring now to FIG. 10, media processor 304 may be implemented in some preferred embodiments as one core ("Core 3") of a multi-core microprocessor 400 on a single semiconductor die (although a separate processor may be used in some embodiments of the present invention). The media processor in this case is capable of showing high-definition multimedia presentations on the displays of fuel dispenser 100. Various other dispenser functions can be separately and asynchronously implemented in the remaining cores. As shown, for example, the CRIND may implemented in Core 1, whereas forecourt control is implemented in Core 2. The dispenser processor (hydraulic control) is implemented in Core 4. In practice, one core may support multiple applications (and others left reserved); the only limitations being common operating system for those applications sharing a given core, and up to four unique operating systems permissible in the case of a quad-core CPU.

In this example, communications between applications occurs through shared memory. Alternatively, each application may communicate by IP address, as if separate physical devices, even though physically common. In a preferred embodiment, chip 400 may be the i.MX6 quad-core processor available from NXP Semiconductor. In addition, to the four cores, this chip has ancillary processing units, such as for video rendering and encryption, that can be used as necessary or desired during operation of the respective cores. Additional details regarding the construction and operation of a multi-core processor that may be used in this application is provided in copending application Ser. No. 15/470,284, filed Mar. 27, 2017, incorporated fully herein by reference for all purposes.

While one or more preferred embodiments of the invention have been described above, it should be understood that any and all equivalent realizations of the present invention are included within the scope and spirit thereof. Thus, the embodiments depicted are presented by way of example only and are not intended as limitations upon the present invention as modifications can be made. Therefore, it is contemplated that any and all such embodiments are included in the present invention as may fall within the scope and spirit thereof.

What is claimed is:

1. A fuel dispenser comprising:
   fuel flow piping having a hollow structure that produces a flow path from a source of fuel toward a fueling nozzle;
   fuel handling components disposed along said fuel flow piping;
   control electronics in operative communication with said fluid handling components; and
   a payment system including a PIN pad, a display processor external to the PIN pad and having an associated memory storing payment display data in encrypted form, and a display, said PIN pad in communication with said display processor and said display processor being in communication with said display;
   said PIN pad further storing a plurality of electronic tokens corresponding to the payment display data; and
   said PIN pad being operative to transmit said electronic tokens to said display processor, said display processor utilizing said electronic tokens to access specific payment display data stored by the associated memory, said display processor configured to display the specific payment display data on said display.

2. A fuel dispenser as set forth in claim 1, wherein said payment system includes a card reader in communication with the PIN pad.

3. A fuel dispenser as set forth in claim 2, wherein said PIN pad executes a secure payment application.

4. A fuel dispenser as set forth in claim 3, wherein said PIN pad communicates with one of a dispenser hub and a point of sale (POS) system external to the fuel dispenser.

5. A fuel dispenser as set forth in claim 1, wherein said electronic tokens are cryptographically unique.

6. A fuel dispenser as set forth in claim 5, wherein the display processor is configured to enter a payment mode during which said display processor receives said electronic tokens, said display processor displaying nonpayment information on said display when not in the payment mode.

7. A fuel dispenser as set forth in claim 5, wherein the display processor is one core of a multi-core processor having at least two processor cores on a single semiconductor die.

8. A fuel dispenser as set forth in claim 7, wherein said multi-core processor has at least four of said processor cores.

9. A fuel dispenser as set forth in claim 1, wherein said payment display data comprises transaction related prompts and messages on the display.

* * * * *